United States Patent
Miyazawa et al.

(10) Patent No.: US 6,229,767 B1
(45) Date of Patent: May 8, 2001

(54) DISPLAY DEVICE AND ELECTRONIC WATCH USING THE DEVICE

(75) Inventors: Eiichi Miyazawa, Suwa; Yasuo Arikawa, Chino, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/124,991

(22) Filed: Jul. 30, 1998

(30) Foreign Application Priority Data

| Aug. 4, 1997 | (JP) | 9-209475 |
| Dec. 24, 1997 | (JP) | 9-355734 |
| Jun. 9, 1998 | (JP) | 10-161211 |

(51) Int. Cl.$^7$ .................................................. G04B 1/00
(52) U.S. Cl. ........................ 368/205; 368/242; 368/83; 368/234
(58) Field of Search .................. 368/247, 83, 203–205, 368/228, 232, 234

(56) References Cited

U.S. PATENT DOCUMENTS

| 4,095,217 | * | 6/1978 | Tani et al. ............................. 368/205 |
| 4,139,279 |   | 2/1979 | Laesser et al. . |
| 4,183,628 |   | 1/1980 | Laesser et al. . |
| 5,359,691 |   | 10/1994 | Tai et al. . |

FOREIGN PATENT DOCUMENTS

| 27 23 484 | 11/1977 | (DE) . |
| 0 240 345 | 10/1987 | (EP) . |
| 52-55565 | 5/1977 | (JP) . |
| 60-147720 | 8/1985 | (JP) . |
| WO 95/17692 | 6/1995 | (WO) . |
| WO 95/17962 | 6/1995 | (WO) . |
| WO 95/27919 | 10/1995 | (WO) . |
| WO 96/31794 | 10/1996 | (WO) . |

\* cited by examiner

*Primary Examiner*—Bernard Roskoski
(74) *Attorney, Agent, or Firm*—Oliff & Berridge, PLC

(57) ABSTRACT

A display device and an electronic watch permit various information to be clearly distinguished from a background when a solar battery is placed within a display area for displaying the information. A display device and the like include a polarizer, a liquid crystal layer, a polarization separating film, and a solar battery. The polarization separating film operates to transmit linearly polarized light polarized in one direction and to reflect other linearly polarized light. Since the surface of the solar battery has a dark color, such as black, a dark-colored background is displayed by light traveling along an optical path. Information, such as numbers, is displayed in a light reflection color by light that is reflected by the polarization separating film and travels along an optical path. The information, such as numbers, is displayed in a light reflection color. Therefore, information, such as numbers, can be displayed in a high contrast when the solar battery is placed within an inner region of the display plane.

14 Claims, 14 Drawing Sheets

DISPLAY DEVICE AND ELECTRONIC WATCH USING THE DEVICE

BACKGROUND OF THE INVENTION

1. Field of Invention

The present invention relates to a display device for displaying letters, numbers, patterns, and the like. The present invention also relates to an electronic watch for measuring and displaying time, such as a wristwatch or a stopwatch.

2. Description of Related Art

Hitherto, a display device, which displays numbers, letters, and other types of information by utilizing a flat display such as a liquid crystal display, has been widely known. As such a display device, for example, a display device shown in FIG. 20 is well known, in which a pair of polarizers 52 and 53 are located on both sides of a liquid crystal panel 51 and a reflector 54 is located on the back side of one of the polarizers 53. The pair of polarizers 52 and 53 are placed, for example, so that their polarization axes form a right angle.

In this conventional display device, information, such as numbers, are displayed by applying a predetermined on-state voltage between electrodes of the liquid crystal panel 51, and a background of white or the like is displayed by not applying a voltage. In the figure, a region where an on-state voltage is applied is indicated by "ON", and a region where a voltage is not applied is indicated by "OFF".

In this display device, when a voltage is not applied to the liquid crystal panel 51, as shown by arrow P, linearly polarized light of the external light, that is, natural light that is polarized parallel to the plane of the page passes through the polarizer 52, and is turned into linearly polarized light polarized perpendicular to the plane of the page with its polarization direction twisted through an angle of 90° by the liquid crystal panel 51 in the off state. After passing through the polarizer 53, this linearly polarized light is irregularly reflected by the surface of the reflector 54. A part of the irregularly reflected light sequentially passes through the polarizer 53, the liquid crystal panel 51, and the polarizer 52, and is visible to an outside viewer. This part is thereby perceived as a reflection image from the reflector 54, normally, as a uniform white background.

Next, when an on-state voltage is applied to the liquid crystal panel 51, as shown by arrow Q, linearly polarized light that is parallel to the plane of the page is separated from the external light by the polarizer 52, and passes through the liquid crystal panel 51. Since the liquid crystal panel 51 is in an on state at this time, the polarization direction of the linearly polarized light is kept parallel to the plane of the page without being twisted, and therefore, this linearly polarized light is absorbed by the polarizer 53. As a result, this part is perceived as a dark color, such as black, from outside.

As mentioned above, in this conventional display device, information, such as numbers, is displayed in a dark color of black or the like on a reflection image from the reflector 54, normally, on a uniform white background.

Furthermore, for example, Japanese Unexamined Patent Publication No. 52-55565 discloses the technique of forming the reflector 54, which constitutes a display section of an electronic watch, of a solar battery. According to this electronic watch, a power supply for watch driving is charged with an electromotive force of the solar battery, and the liquid crystal panel and the like are driven by the charged watch-driving power supply.

As mentioned above, while it has been already known that the reflector 54 in the display device is formed of a solar battery, since the surface of the solar battery usually has a dark color, such as black or dark blue, when a background is displayed by reflecting external light by the reflector 54, as shown by arrow P in FIG. 20, it is displayed in a dark color of black or the like. On the other hand, information, such as numbers, is displayed in a dark color of black or the like by using a light absorption property of the polarizer 53, as shown by the arrow Q.

In short, when the reflector is formed of a solar battery in the conventional display device, information, such as numbers, is displayed in a dark color of black or the like on a background of a similar dark color such as black. Therefore, the information, such as numbers, cannot be clearly distinguished. Consequently, the technique of placing a solar battery within a display plane of a watch or the like has not yet been put into actual use. When the solar battery is used, it cannot help being located outside the display plane of the watch or the like.

SUMMARY OF THE INVENTION

The present invention has been made in view of the problems mentioned above, and a first object of the present invention is to permit information, such as numbers, to be clearly distinguished from a background when a solar battery is placed within a display plane of a watch or the like.

A second object of the present invention is to produce a display on a watch or the like using light emitted from a light emitting device in a dark place where external light does not enter when a solar battery is placed within a display plane of the watch or the like.

(1) In order to achieve the above first object, a display device of the present invention includes (a) a first polarization separator that transmits linearly polarized light polarized in a first direction and does not transmit linearly polarized light polarized in a direction perpendicular to the first direction, (b) a polarization changing element positioned to receive linearly polarized light emerging from the first polarization separator and that selects between a state of changing the polarization direction of polarized light transmitted therethrough and a state of not changing the polarization direction, (c) a second polarization separator disposed opposite to the first polarization separator with the polarization changing element interposed therebetween, the second polarization separator transmitting linearly polarized light polarized in a second direction and reflecting linearly polarized light polarized in a direction perpendicular to the second direction, and (d) a solar battery disposed opposite to the polarization changing element with the second polarization separator disposed therebetween, the solar battery receiving external light and converting the external light into electric energy.

In the above structure and structures that will be described below, the first polarization separator has the polarization separating function of transmitting linearly polarized light of light incident from the side of a viewer that is polarized in a first predetermined direction and not transmitting other polarized light, and furthermore, of transmitting linearly polarized light of light incident from an opposite side to the viewer that is polarized in the first direction and not transmitting other polarized light.

Furthermore, the second polarization separator has the polarization separating function of transmitting linearly polarized light of light incident from the side of the polarization changing element that is polarized in a second direction, reflecting other polarized light, and furthermore, of transmitting linearly polarized light of light incident from an opposite side to the polarization changing element that is polarized in the second direction.

The first polarization separator may be formed of a conventional polarizer. A conventional polarizer is a polarized light separation element having a property of transmitting linearly polarized light of incident light that is polarized in one direction and not transmitting other linearly polarized light. For example, it may be formed by sandwiching a polarizing layer between protective layers of TAC (Triacetyl Cellulose).

The polarization changing element may be formed of, for example, liquid crystal. As the liquid crystal, various kinds of liquid crystals may be used, such as TN (Twisted Nematic) liquid crystal, STN (Super-Twisted Nematic) liquid crystal, and ECB (Electrically Controlled Birefringence) liquid crystal. The STN liquid crystal includes an STN liquid crystal using a color compensation optical anisotropic material, such as F-STN (Film Compensated STN) liquid crystal.

The solar battery may be, as is well-known, formed of, for example, an element having a pn junction of silicon, and it converts energy radiated from external light, such as sunbeams, into electric energy.

The second polarization separator may be formed of 1) a polarization separating film having a structure in which many thin films are stacked, as disclosed in the international publication (International Publication No. WO95/17692 or WO95/27919), 2) a polarization separating plate having a structure in which a λ/4 phase plate is placed on one or both sides of a cholesteric liquid crystal layer, 3) a polarization separation member structured so that it separates light into reflected polarized light and transmitted polarized light by utilizing Brewster's angle (SID 92 *Digest*, pp. 427–429), or 4) a polarization separation member utilizing a hologram.

According to the display device thus structured, it is possible to display a background by light that passes through the second polarization separator, reaches the surface of the solar battery, that is, the light receiving surface, and is partially reflected therefrom, and to simultaneously display information, such as numbers, by light that is reflected from the second polarization separator without passing therethrough. Since the surface of the solar battery usually has a dark color such as black, the background displayed in the above-mentioned manner has also a dark color such as black. On the other hand, the condition of reflected light from the second polarization separator is determined by the surface condition of the second polarization separator. If the surface is a smooth flat surface, the reflected light is a mirror-reflected light of a bright color. When the surface of the second polarization separator is a light scattering surface, reflected light therefrom is a bright and irregularly reflected light.

In short, according to the display device and the like of the present invention, when a solar battery is used as a reflector, information such as numbers can be displayed in a light color on a background of black or the like. Therefore, a watch display or another display can be produced without any practical trouble. Furthermore, since the background in the display plane, that is, a wide region in the display plane, serves as a light receiving surface of the solar battery, it is possible to cause the solar battery to gather large amounts of external light and convert the light into electric energy. Still furthermore, since the solar battery can be placed within the display area where watch information such as number information is displayed, it is possible to markedly reduce the overall size of the display device, or to establish a wide display area for watch display or the like, compared with a conventional case in which the solar battery is placed separate from the display area.

(2) While the second polarization separator may be formed of various types of devices in the display device having the above structure as mentioned above, it may be formed of a polarization separating film having the structure disclosed in the aforesaid international application (WO95/17692 or WO95/27919). The polarization separating film has a multilayer structure in which two types of layers A and B are alternately stacked. Every two adjacent layers of these plural layers A and B in the stacking direction have a same refractive index in one direction, and a different refractive index in a direction at right angles thereto. In addition, the plural layers are different in thickness.

According to the above-described display device having a structure in which a polarization separating film having a thin-film multilayer structure composed of a plurality of stacked thin films is used as the second polarization separator, the polarization separating film having such a structure may be formed in a considerably small thickness, and may be made flexible. Consequently, it is possible to reduce the overall thickness of the electronic watch or the like and to simplify the manufacturing process.

(3) Next, an electronic watch according to the present invention for measuring and displaying time includes (a) a first polarization separator that transmits linearly polarized light polarized in a first direction and does not transmit linearly polarized light polarized in a direction perpendicular to the first direction, (b) a polarization changing element positioned to receive the linearly polarized light emerging from the first polarization separator and to select between a state of changing the polarization direction of polarized light to be transmitted and a state of not changing the polarization direction, (c) a second polarization separator disposed opposite to the first polarization separator with the polarization changing element disposed therebetween, the second polarization separator transmitting linearly polarized light polarized in a second direction and reflecting linearly polarized light polarized in a direction perpendicular to the second direction, (d) a solar battery disposed opposite to the polarization changing element with the second polarization separator disposed therebetween, the solar battery receiving external light and converting the external light into electric energy.

According to this electronic watch, similarly to the display device described above in (1), when the solar battery is used as a reflector, information such as numbers can be displayed in a light color on a background of black or the like. Therefore, a display can be produced without any practical trouble. Furthermore, since the background in the display plane, that is, a wide region in the display plane, serves as a light receiving surface of the solar battery, the solar battery gathers large amounts of external light and converts the light into electric energy. Still furthermore, since the solar battery is placed in the display area where watch information such as number information is displayed, it markedly reduces the overall size of the electronic watch, and establishes a wide display area for watch display or the like, compared with a conventional case in which the solar battery is placed separate from the display plane.

(4) In the electronic watch having the structure mentioned above, the second polarization separator may be formed of a polarization separating film in which many thin films are stacked.

(5) In order to achieve the above second object, an electronic watch for measuring and displaying time according to the present invention may include (a) a first polarization separator that transmits linearly polarized light polarized in a first direction and does not transmit linearly polarized light polarized in a direction perpendicular to the first direction, (b) a polarization changing element positioned to receive linearly polarized light emerging from the first polarization separator and to select between a state of changing the polarization direction of polarized light transmitted therethrough and a state of not changing the polarization direction, (c) a second polarization separator placed opposite to the first polarization separator with the polarization changing element interposed therebetween, the second polarization separator transmitting linearly polarized light polarized in a second direction and reflecting linearly polarized light polarized in a direction perpendicular to the second direction, (d) a transparent surface-emitting device placed on an opposite side of the polarization changing element with the second polarization separator disposed therebetween, and (e) a solar battery placed opposite to the second polarization separator with the transparent surface-emitting device disposed therebetween, the solar battery receiving external light and converting the external light into electric energy.

According to this electronic watch, similarly to the display device described in the above (1), when the solar battery is used as a reflector, information such as numbers can be displayed in a light color on a background of black or the like. Therefore, a watch display can be produced without any practical trouble. Furthermore, since the background in the display plane, that is, a wide region in the display plane, serves as a light receiving surface of the solar battery, it is possible to cause the solar battery to gather large amounts of external light and to convert the light into electric energy. Still furthermore, since the solar battery can be placed in a display area where time information such as number information is displayed, it is possible to markedly reduce the overall size of the electronic watch, and to establish a wide display area for watch display or the like, compared with a conventional case in which the solar battery is placed separate from the display area.

In addition, according to this electronic watch using the transparent surface-emitting device, even when the electronic watch is put in a dark place where external light does not enter, a watch display can be produced by utilizing light from the transparent surface-emitting device that is placed on the back side of the second polarization separator as viewed from the viewer.

In the electronic watch described above in (5), the elements, the first polarization separator, the polarization changing element, the solar battery, and the second polarization separator, may be the same as those used in the display device described above in (1).

(6) In the electronic watch described above in (5), while the transparent surface-emitting device may have an arbitrary shape or structure, preferably, it includes a light source for emitting light, and a light guide member provided with a light emitting surface on the side of the polarization changing element to guide the light from the light source to the light emitting surface.

(7) When light is emitted from the light emitting surface of the light guide member as in the electronic watch mentioned above in (6), it can be emitted from the light emitting surface by forming a convex portion or a concave portion on the light emitting surface or an opposite surface thereto. For example, light can be emitted from the light emitting surface in a flat form by forming cylindrical projections on the light emitting surface, forming cylindrical recesses on the light emitting surface, forming conical projections on an opposite surface to the light emitting surface, forming conical recesses on the opposite surface to the light emitting surface, forming hemispheric projections on the opposite surface to the light emitting surface, or forming hemispheric recesses on the opposite side to the light emitting surface.

(8) In the electronic watch having the structures mentioned above, the transparent surface-emitting device may include a light-storage light emitting layer. This light-storage light emitting layer may include a substance that can hold electrons, which are excited by absorbed light, in an excited state, and emit light by recombination of the held electrons and holes.

When such a light-emitting substance absorbs light, first, electrons are excited in a first excited state, trapped in the first excited state by the trapping center caused by the impurity center or crystal lattice defect, thereby being held in a predetermined excited state. After that, the electrons held by the trapping center are returned to the first excited state by thermal activation, and recombined with holes, thereby emitting light. Such a light-emitting substance may be, for example, a substance containing strontium aluminum oxide ($SrAl_2O_4$) as a parent crystal and rare earth elements as impurities.

This light-storage light emitting layer may be replaced with a light emitting unit composed of a light guide member and a light source, or may be provided together with the light emitting unit. The use of this light-storage light emitting layer makes it possible to store energy in the light-storage light emitting layer in a light environment and to emit light from the light-storage light emitting layer based on the energy in a dark environment. Watch display can be performed by utilizing the emitted light.

The light-storage light emitting layer needs to have a light storage property and a property of transmitting an amount of light that can charge the solar battery. In order to add such a light transmitting property to the light-storage light emitting layer, it may be possible to adopt methods of, for example, 1) reducing the thickness of the light-storage light emitting layer, 2) devising a light-storage material, and 3) subdividing the light storage area into small dot-like sections. When the light storage area is subdivided into small dot-like sections, light passes through parts other than the light-storage sections and is absorbed by the solar battery. By changing the proportion of the light-storage sections, the proportion of stored light and electric power generated by sunbeams can be optimized.

(9) In the electronic watch having the above-mentioned structure, a light diffusing layer may be placed on the viewer side of the transparent surface-emitting device. This can achieve a bright watch display utilizing light emitted from the transparent surface-emitting device.

(10) In order to achieve the above first object, an electronic watch according to the present invention may include a polarizer, a TN liquid crystal layer, a polarized fight separating film for transmitting linearly polarized light polarized in a first direction and reflecting linearly polarized light polarized in a direction substantially perpendicular to the first direction, and a solar battery, wherein these components are disposed one on top of another in this order.

DETAILED DESCRIPTION OF PREFERRED EMBODIMENTS

Figure 4:
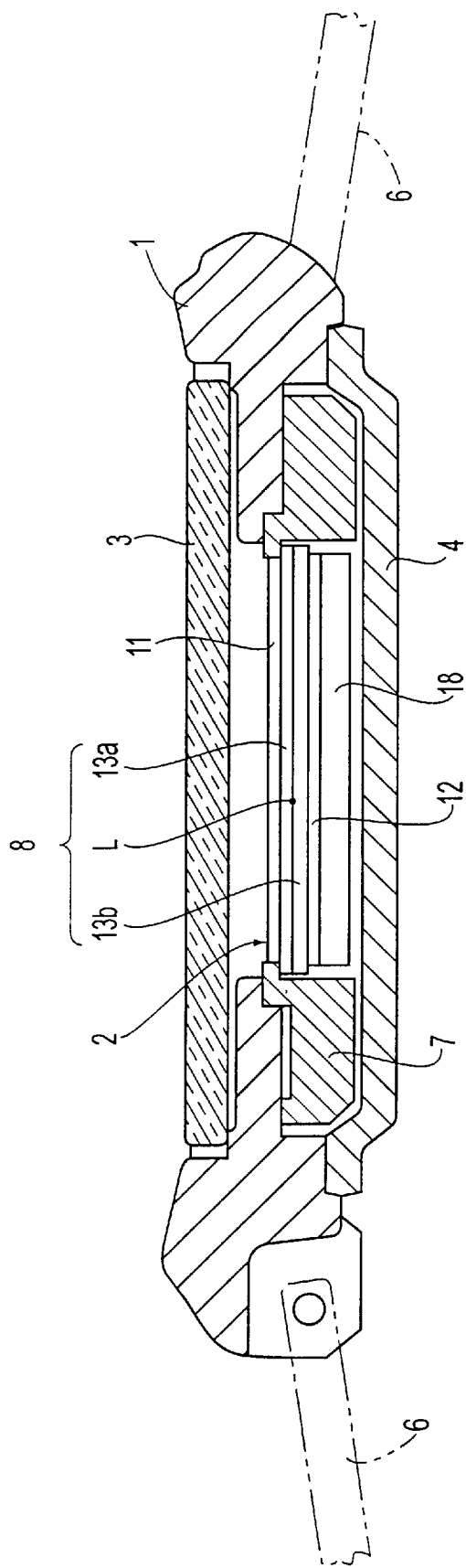
FIG. 4 is a cross-sectional view showing the sectional structure of an electronic wristwatch as the electronic watch according to an embodiment of the present invention.

FIG. 4 shows a cross-sectional structure of an embodiment of an electronic watch, in particular, an electronic wristwatch, using a display device of the present invention as a display section. This wristwatch includes a casing 1 made of, for example, plastic, an assembly 2 housed inside the casing 1, a glass plate 3 fixed to the casing 1 and positioned above the assembly 2, and a back cover 4 for fixing the assembly 2. Numeral 6 denotes a watchband.

The assembly 2 includes a frame 7, a liquid crystal layer section 8 supported by the frame 7 and serving as a polarization changing element, a polarizer 11 bonded to the outer surface (the upper surface in the figure) of the liquid crystal layer 8 and serving as a first polarization separator, a polarization separating film 12 placed on the opposite side to the polarizer 11 across the liquid crystal layer 8 and serving as a second polarization separator, and a solar battery 18 placed on the bottom side of the polarization separating film 12.

The polarizer 11 is formed of a usual polarizer, and operates to transmit linearly polarized light polarized in a first direction and to prevent the transmission of linearly polarized light polarized in a direction perpendicular to the first direction by absorption, dispersion, or the like. In this embodiment, the polarizer 11 is positioned so that its transmission axis points in a direction perpendicular to the plane of the page of FIG. 1. The polarization separating film 12 is formed of a polarization separating film having a structure in which many thin films are stacked, as shown in FIG. 2. As mentioned above, the polarization separating film 12 operates to transmit linearly polarized light polarized in a second direction and to reflect other linearly polarized light instead of absorbing them, in particular, to totally reflect linearly polarized light polarized in a direction at right angles to the transmission axis.

In three intersecting axial directions, X, Y, and Z in FIG. 2, two types of layers A and B are formed in a multilayer state by, for example, extrusion molding. The layers are extended in one direction (e.g., the X direction), and are not extended in another direction (i.e., the Y direction). That is, the X-axis direction is an extending direction, and the Y-axis direction is a lateral direction. A material B has a refractive index of $n_B$ (e.g., $n_B=1.64$), and this refractive index is not substantially changed by extension. On the other hand, a material A has a property in which the refractive index is changed by extension. For example, when a sheet made of the material A is extended (or stretched) in one axial direction, it has a refractive index $n_{AX}$ (e.g., $n_{AX}=1.88$) in the extending direction (i.e., the X direction) and a different refractive index of $n_{Ay}$ (e.g., $n_{Ay}=1.64$) in the lateral direction (the Y direction).

When the multilayer structure shown in FIG. 2 made of materials A and B is extended in the X direction, a large difference in refractive index $\Delta n=1.88-1.64=0.24$ arises in the extending direction. On the other had, in the Y direction perpendicular to the X direction, a difference $\Delta n$ in refractive index between the layers A and B=1.64−1.64=0, and there is no difference in refractive index. Because of such an optical property, when light enters the polarization separating film 12, polarized light of the incident light polarized in a direction E of the transmission axis passes through the polarization separating film 12. On the other hand, polarized light of the incident light polarized in a direction F of the absorption axis is confronted with the refractive index difference $\Delta n$, and is reflected by the section where the difference is present.

Figure 3:
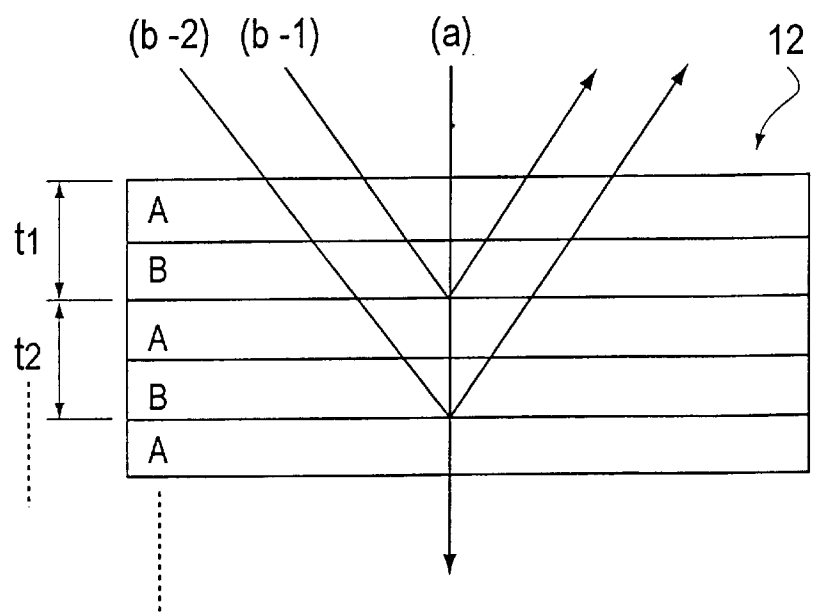
FIG. 3 is a schematic view showing the action of the polarization separating film shown in FIG. 2.

Furthermore, thicknesses t1, t2, t3, . . . of the pairs of layers A and B slightly vary, and therefore, light with different wavelengths (b−1), (b−2), . . . can be reflected by the interface surfaces between the layers, as shown in FIG. 3. In short, the multilayer structure composed of two types of layers A and B having different thicknesses permits efficient reflection of light with all wavelengths. It is possible to reflect white light by setting a combination of thicknesses of the layers that will reflect lights with all wavelengths.

In the polarization separating film 12 of this embodiment, the thicknesses t1, t2, t3, . . . of the layers thereof (see FIG. 2) are set so as to reflect light of all wavelengths in the visible region. The surface of the polarization separating film 12 facing the liquid crystal layer 8 may be a flat surface for mirror-reflecting light, or a light scattering layer, that is, a light diffusing layer. In the case of a flat surface, a reflection image from the polarization separating film 12 is a mirror-reflection image. In the case of a light diffusing layer, a reflection image from the polarization separating film 12 has no pattern, and is monochrome (normally, white). An appropriate color may be added to the image by forming a color layer on the surface of the polarization separating film 12.

The surface of the solar battery 18, that is, the light receiving surface, has a dark color, such as black or dark blue, in the same manner as a normal solar battery. The solar battery 18 receives external light from the light receiving surface and converts the light into electricity. The electricity generated by the conversion charges a battery for watch driving, and then is output as needed to drive the watch.

Figure 5:
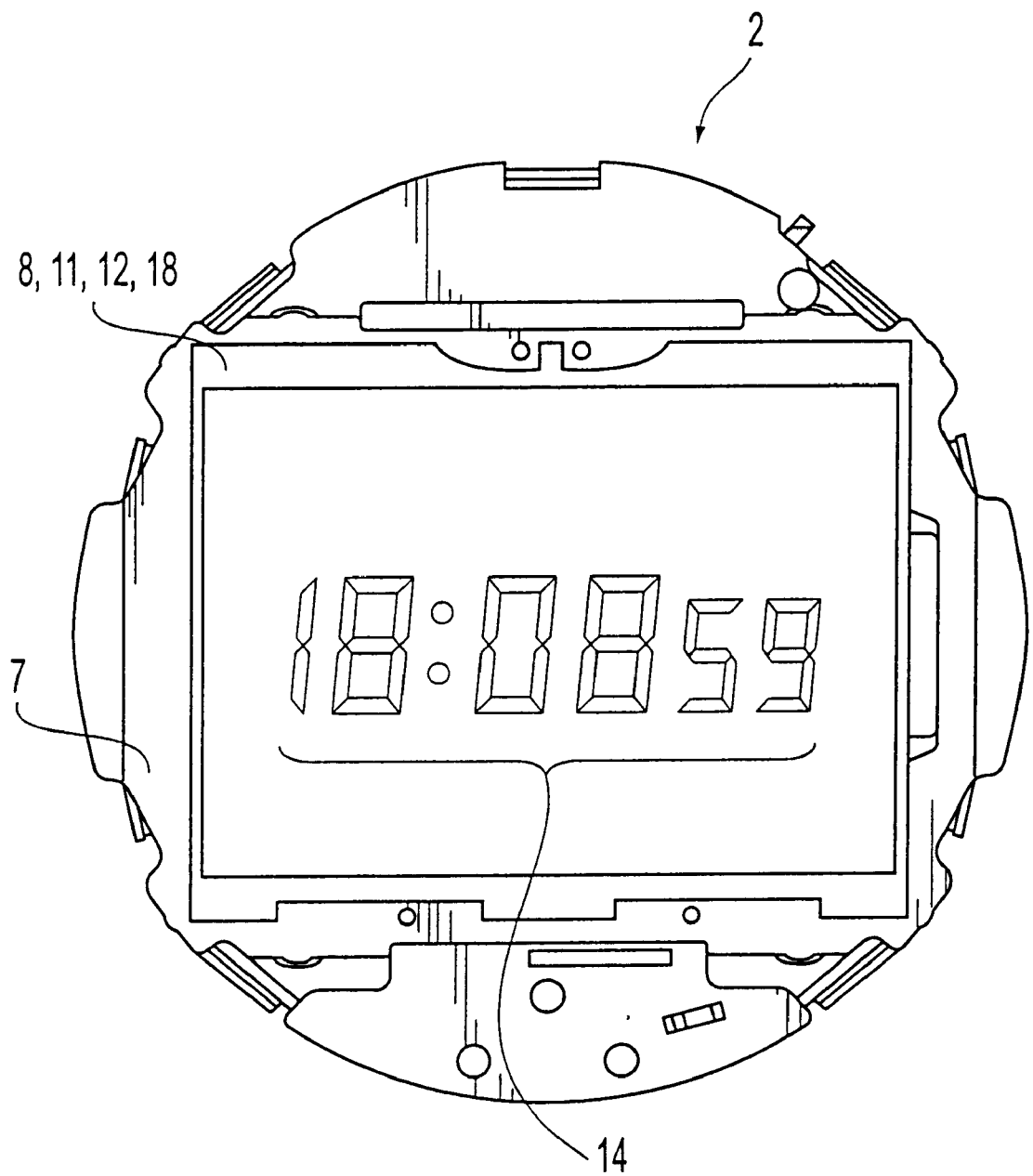
FIG. 5 is a plan view showing an example of a movement for use in the electronic wristwatch shown in FIG. 4.

In FIG. 4, the liquid crystal layer 8 includes a pair of transparent glass substrates 13a and 13b that are opposed to each other. A gap formed between the glass substrates, which is called a cell gap, is sealed with liquid crystal, for example, TN liquid crystal L. The glass substrates 13a and 13b are provided with a plurality of transparent electrodes 14 for displaying information, such as numbers and letters, as shown in FIG. 5. In this embodiment, the transparent electrodes are divided into seven segments to display a one-digit number.

A predetermined voltage can be applied between an opposing pair of segment electrodes 14 respectively formed in the pair of glass substrates 13a and 13b. Depending on whether the voltage is applied (on) or not applied (off), the liquid crystal L can be set in either of two alignment states. The liquid crystal of this embodiment is set so that it does not change the polarization axis of linearly polarized light passing therethrough in the on state, and on the other hand, it twists the polarization axis of the linearly polarized light through an angle of 90° in the off state.

A description will be given below of the operation of the electronic wristwatch having the construction described above.

Figure 1:
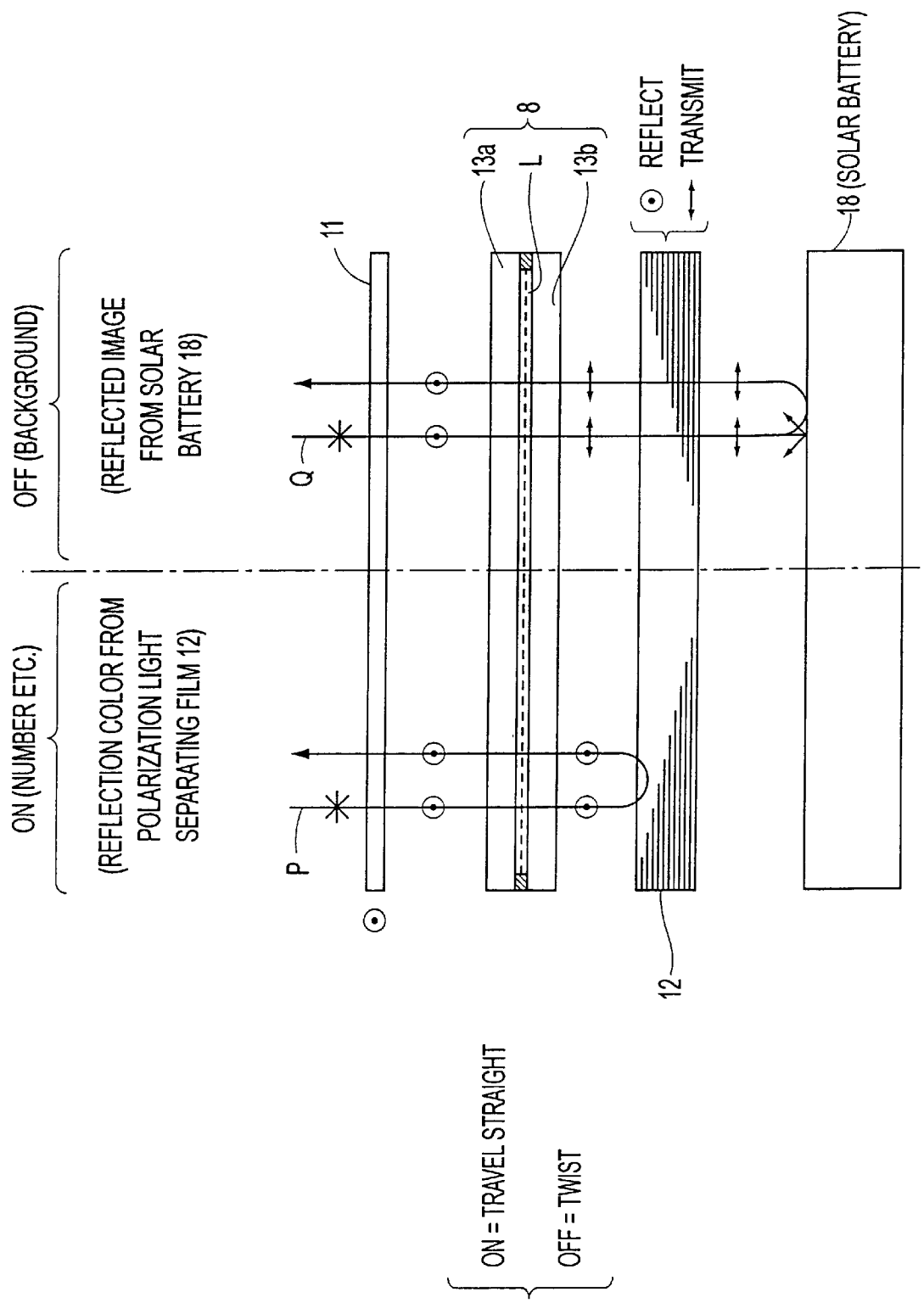
FIG. 1 is a schematic view of a display device according to one embodiment of the present invention.
Figure 2:
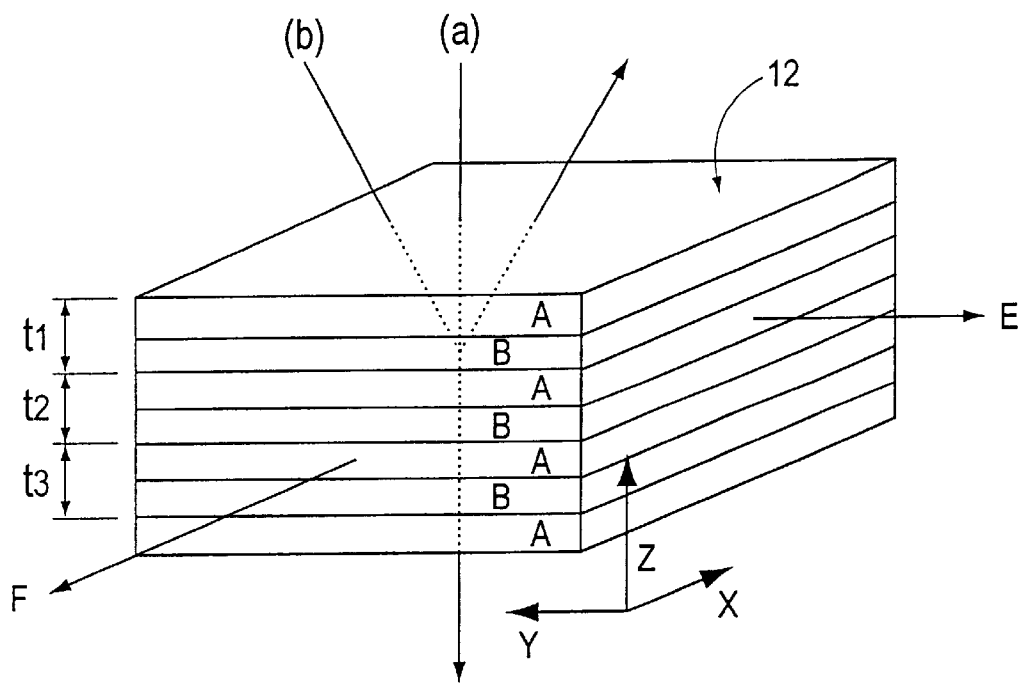
FIG. 2 is a schematic perspective view showing the internal structure of a polarization separating film used as the principal part of the structure shown in FIG. 1.

First, in displaying a background, the liquid crystal layer 8 shown in FIG. 1 is put into the off state. Then, from external light, that is, natural light, linearly polarized light that is polarized in a direction perpendicular to the paper plane passes through the polarizer 11, as shown by arrow Q in FIG. 1, and is turned into linearly polarized light polarized in parallel with the plane of the page with its polarization direction twisted through an angle of 90° by the liquid crystal layer 8 in the off state. This linearly polarized light passes through the polarization separating film 12, and reaches the light receiving surface of the solar battery 18, where most of the light is converted into electric energy. A small portion of the light is turned into reflected light, and perceived by a viewer after passing through the polarization separating film 12, the liquid crystal layer 8, and the polarizer 11. Since the light receiving surface of the solar battery 18 has a dark color, such as black or dark blue, the perceived color is also such a dark color.

In displaying information such as numbers, the liquid crystal layer 8 shown in FIG. 1 is put into the on state. Then, from external light, linearly polarized light that is polarized in a direction perpendicular to the plane of the page is separated by the polarizer 11, and this linearly polarized light passes through the liquid crystal layer 8, as shown by arrow P. At this time, since the liquid crystal layer 8 is in the on state, the polarization direction of the linearly polarized light is not twisted and is held perpendicular to the plane of the page. Therefore, this linearly polarized light is reflected by the layer surfaces of the polarization separating film 12 according to the wavelength, and the reflected light is displayed outside after sequentially passing through the liquid crystal layer 8 and the polarizer 11. Thereby, the on-state segments of the transparent segment electrodes 14 shown in FIG. 5 are displayed in a reflection color of the polarization separating film 12. This reflection color is a light color such as silver, gray, or white.

According to the above description, when a watch display is produced by using external natural light in this embodiment, the background is displayed in a dark color by reflected light from the surface of the solar battery 18, and information such as numbers is displayed thereon in a light reflection color from the polarization separating film 12. Consequently, it is possible to clearly perceive information, such as numbers, without any practical trouble. Furthermore, as shown in FIGS. 1 and 5, since the solar battery 18 is placed within a display area of the watch, the overall size of the electronic watch can be markedly reduced, compared with a case in which the solar battery is placed outside the display area.

Figure 6:
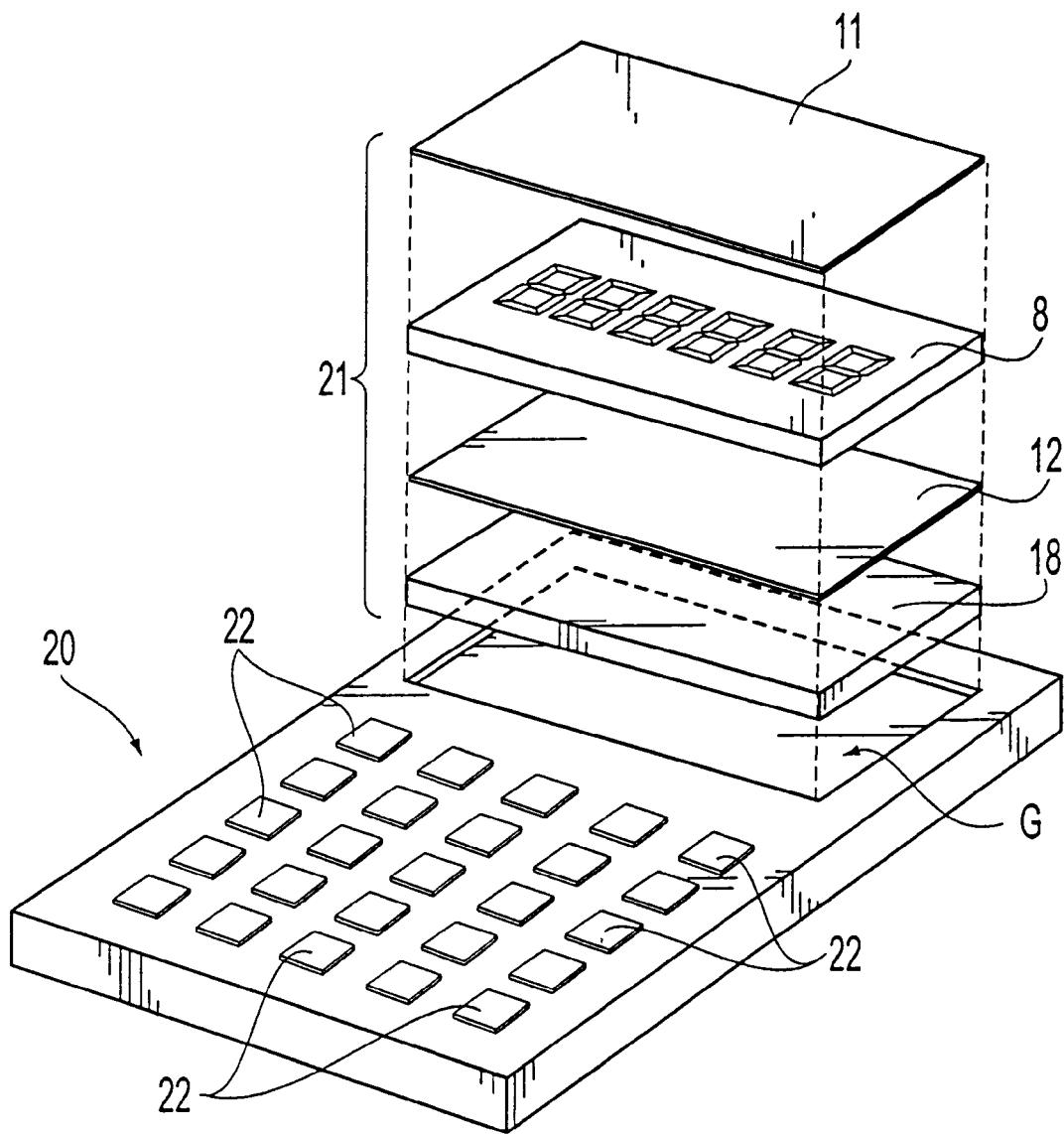
FIG. 6 is an exploded perspective view showing the principal part of an electronic pocket calculator as an application of the display device of the present invention.

FIG. 6 shows another embodiment in which a display device of the present invention is used as a display section of an electronic pocket calculator. In this embodiment, a number display screen 21 of an electronic pocket calculator 20 is formed of the display device of the present invention. In a screen position G of the pocket calculator 20, a solar battery 18, a polarization separating film 12, a liquid crystal layer 8, and a polarizer 11 are laid one on top of another in this order from below, and they constitute the number display screen 21.

The above elements, the polarizer 11, the liquid crystal layer 8, the polarization separating film 12, and the solar battery 18, operate in the same manner as the elements denoted by the same numerals in FIG. 1, and therefore, a detailed description thereof is omitted. Desired numbers and numbers obtained as a result of calculation can be displayed on the number display screen 21 based on the on/off state of segment electrodes in the liquid crystal layer section 8 by selectively operating various types of keys 22. At this time, the background is displayed in a dark color by using the light receiving surface of the solar battery 18, and information, such as numbers, is sharply displayed thereon in a light color, such as silver or gray.

In the electronic pocket calculator 20, since the solar battery 18 is also placed within the display area of the liquid crystal layer 8, there is no need to prepare an area to locate the solar battery 18 outside the screen region G, which makes it possible to markedly reduce the overall size of the calculator 20.

While the present invention has been described with reference to the preferred embodiments, the present invention is not limited to the embodiments, and various modifications may be made within the scope of the present invention determined by the claims.

For example, while FIG. 4 illustrates the case in which the display device of the present invention applies to an electronic wristwatch and FIG. 6 illustrates the case in which it applies to an electronic pocket calculator, the display device of the present invention is applicable as a display section of other types of electronic instruments. Furthermore, while the present invention applies to the wristwatch in the embodiment shown in FIG. 4, it may be, of course, applicable to an electronic watch having another structure, such as a stopwatch.

While a liquid crystal panel using TN liquid crystal is used as the polarization changing element, which is able to choose between a state for changing the polarization direction of polarized light to be transmitted and a state for not changing the polarization direction, in the above embodiments, a liquid crystal panel using STN liquid crystal or ECB liquid crystal may be used instead.

Furthermore, while a multilayer structure in which a plurality of thin films are stacked as shown in FIG. 2 is adopted as the second polarization separator that operates to transmit linearly polarized light polarized in the second direction and to reflect linearly polarized light polarized in a direction perpendicular to the second direction, it may be replaced with 1) a polarization separating plate having a structure in which a λ/4 phase plate is placed on one or both sides of a cholesteric liquid crystal layer, 2) a polarization separating element structured so that it separates light into reflected polarized light and transmitted polarized light by utilizing Brewster's angle (SID 92 Digest, pp. 427–429), or 3) a polarization separating element utilizing a hologram.

Figure 8:
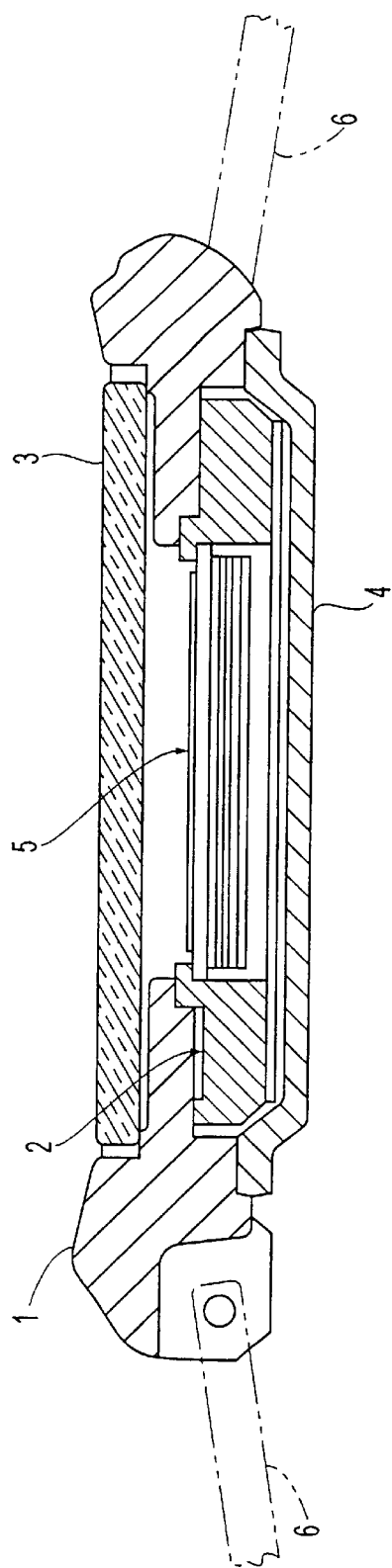
FIG. 8 is a cross-sectional view showing the sectional structure of an electronic watch according to one embodiment of the present invention.

FIG. 8 shows an electronic watch, in particular, an electronic wristwatch according to one embodiment of the present invention. This electronic watch includes a casing 1 made of, for example, plastic or metal, an assembly 2 housed inside the casing 1, a glass plate 3 fixed to the casing 1 and positioned over the assembly 2, and a back cover 4 for fixing the assembly 2. Numeral 6 denotes a watchband.

Figure 7:
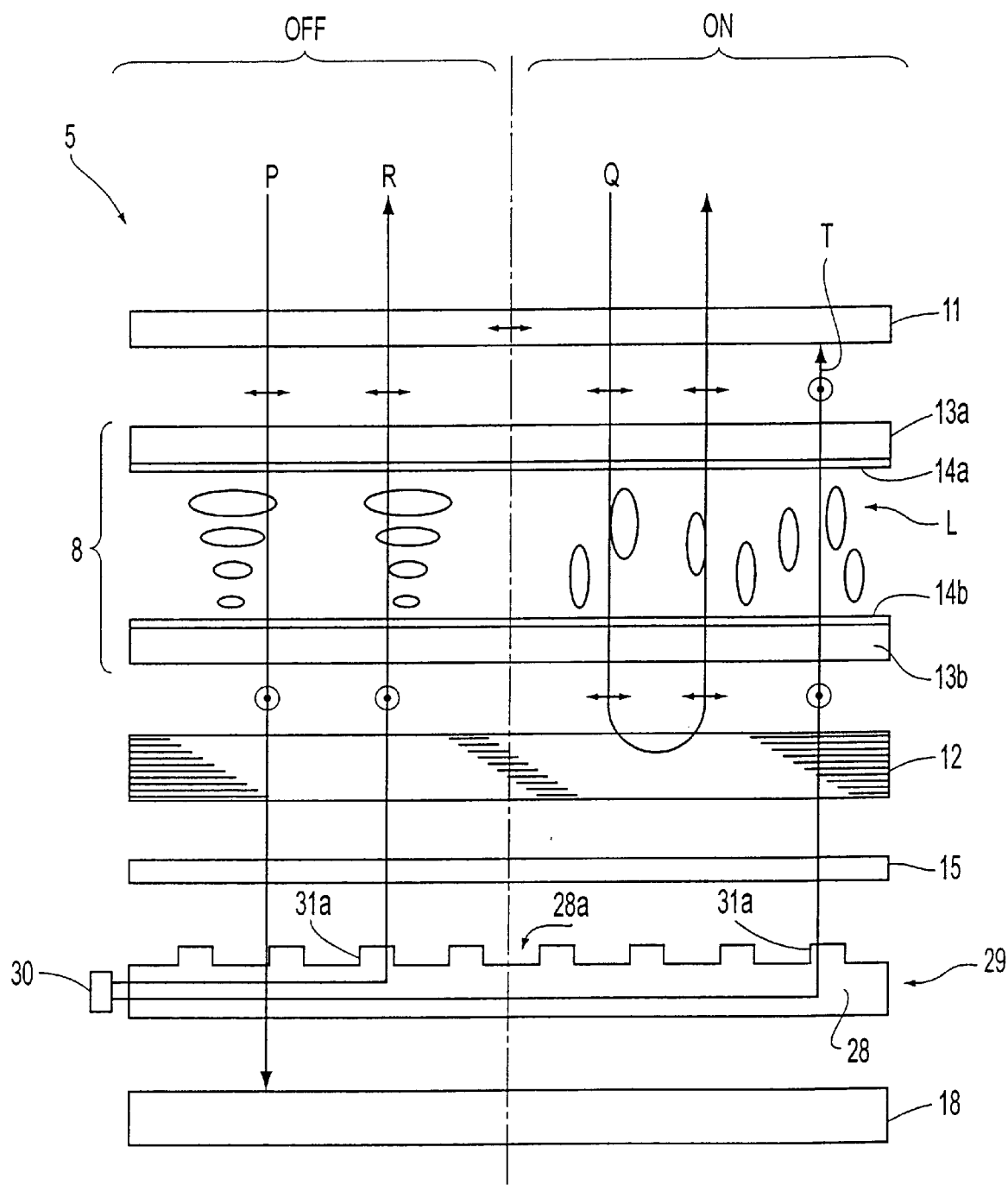
FIG. 7 is a schematic sectional view showing an example of a liquid crystal display unit for use in the electronic watch according to the present invention.
Figure 9:
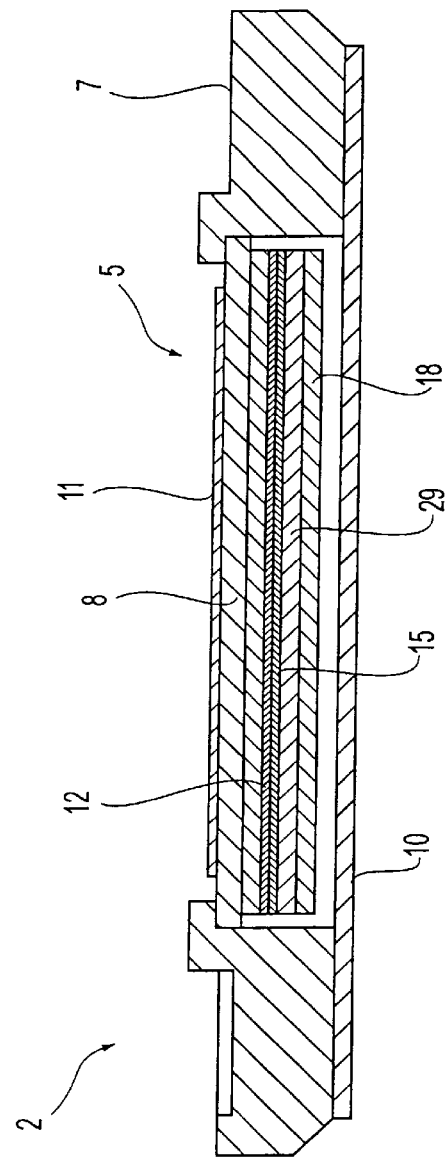
FIG. 9 is an enlarged cross-sectional view showing the principal part of the sectional structure shown in FIG. 8.

The assembly 2 includes, as shown in FIG. 9, a frame 7, a liquid crystal display unit 5 supported by the frame 7, and a circuit substrate 10 placed below the liquid crystal display unit 5. As shown in FIG. 7, the liquid crystal display unit 5 includes a liquid crystal layer 8 serving as polarization changing element, a polarizer 11 placed on the viewer side (the upper side of the figure) of the liquid crystal layer 8 and serving as first polarization separator, and a polarization separating film 12 placed on the back side (the lower side of the figure) of the liquid crystal layer 8 as viewed from the viewer and serving as a second polarization separator. On the back side of the polarization separating film 12, a light diffusing layer 15, a transparent surface-emitting device 29, and a solar battery 18 are further placed in this order.

The polarizer 11 is formed of a conventional polarizer, and operates to transmit linearly polarized light of light incident from the viewer side that is polarized in a first predetermined direction, in this example, in a direction parallel to the plane of the figure, and to prevent transmission of other linearly polarized light. Furthermore, the polarizer 11 operates to transmit linearly polarized light of light incident from an opposite side to the viewer that is polarized in a direction parallel to the plane of the figure, and to prevent transmission of other polarized light.

The polarization separating film 12 is formed of a polarization separating film having a structure in which many thin films are stacked as shown in FIG. 2. In FIG. 7, the polarization separating film 12 transmits linearly polarized light of light incident from the side of the liquid crystal layer 8 that is polarized in a second direction, in this embodiment, in a direction perpendicular to the plane of the figure, and reflects other polarized light, in particular, totally reflects light polarized in a direction parallel to the plane of the figure. Furthermore, the polarization separating film 12 operates to transmit linearly polarized light of light incident from an opposite side to the liquid crystal layer 8, that is, from the side of the light emitting device 29 that is polarized in a direction perpendicular to the plane of the figure.

In the polarization separating film 12 of this embodiment, the thicknesses t1, t2, t3, . . . of layers A and B (see FIG. 5) are set so as to reflect light with all wavelengths included in the visible region. The surface of the polarization separating film 12 facing the liquid crystal layer 8 may be a flat surface for mirror-reflecting light, or a light scattering layer, that is, a light diffusing layer. In the case of a flat surface, a reflection image from the polarization separating film 12 is a mirror-reflection image. In the case of a light diffusing layer, a reflection image from the polarization separating film 12 has no pattern, and is monochrome (normally, white). An appropriate color may be added to the image by forming a color layer on the surface of the polarization separating film 12.

The surface of the solar battery 18, that is, the light receiving surface has a dark color, such as black or dark blue, in the same manner as a conventional solar battery. The solar battery 18 receives external light from the light receiving surface and converts the light into electricity. The electricity generated by the conversion is charged in a battery for watch driving, and then, is output therefrom as needed in order to drive the watch.

In FIG. 7, the liquid crystal layer 8 includes an opposing pair of transparent substrates 13a and 13b. A gap formed between the transparent substrates, what is called a cell gap, is sealed with liquid crystal, for example, TN liquid crystal L. The transparent substrates 13a and 13b are made of a transparent material, such as glass, or plastic. On the inner surfaces thereof, a plurality of transparent electrodes 14a and 14b for displaying visible information composed of numbers, letters and the like, are formed of ITO (Indium Tin Oxide), or the like. On the surfaces of the substrates where the electrodes 14a and 14b are formed, alignment layers are further formed of polyimide, polyvinyl alcohol, and the like, and they are subjected to alignment treatment such as rubbing.

Figure 10:
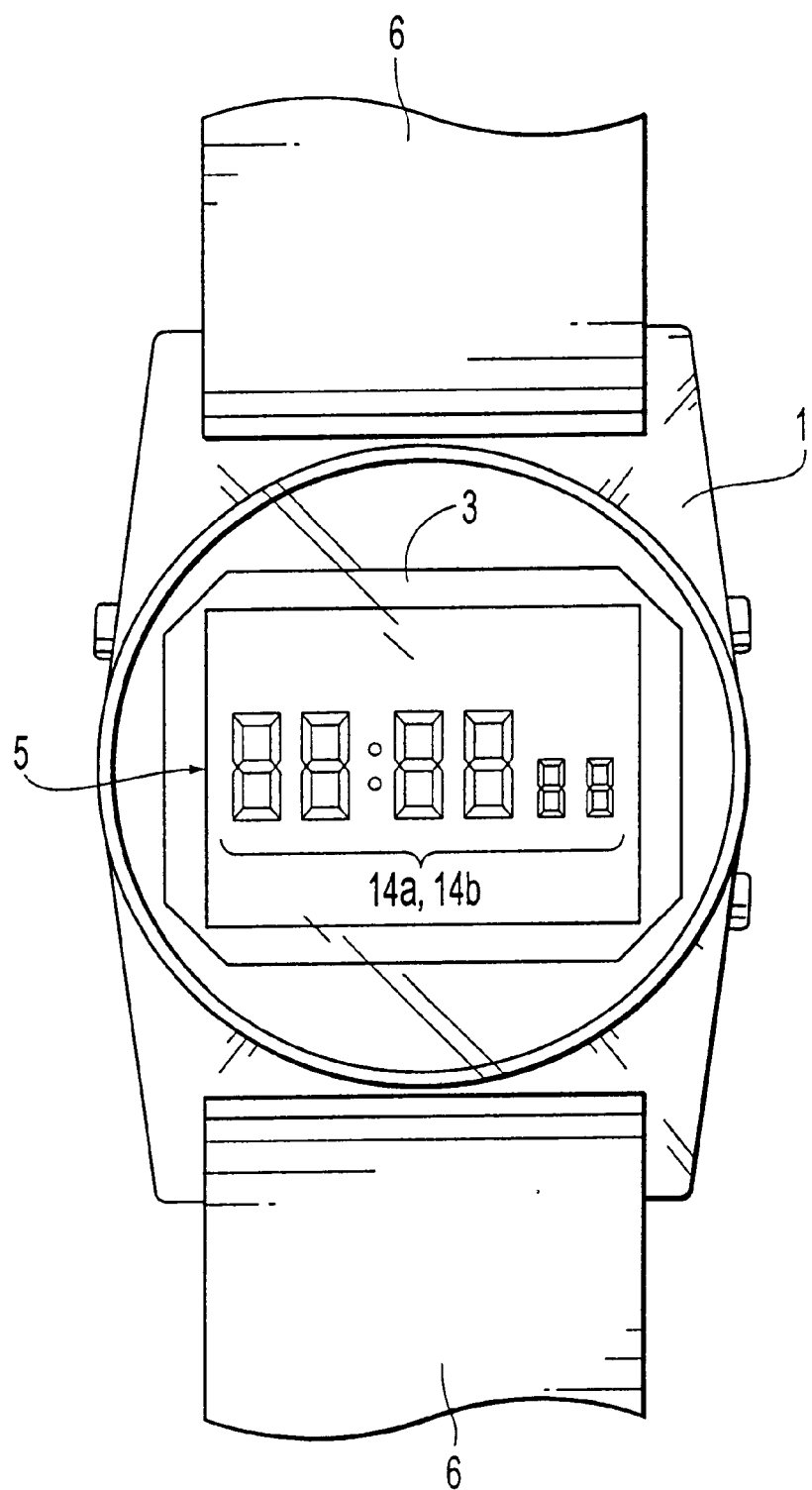
FIG. 10 is a front view of the electronic watch according to the embodiment of the present invention.

In this embodiment, the transparent electrodes 14a and 14b constitute a pattern in which six one-digit numbers, each composed of seven segments, are arranged, as shown in FIG. 10. By selectively changing colors of some of these segments, various types of numbers are displayed for time display. Of course, any information other than numbers can be displayed as needed.

Figure 11:
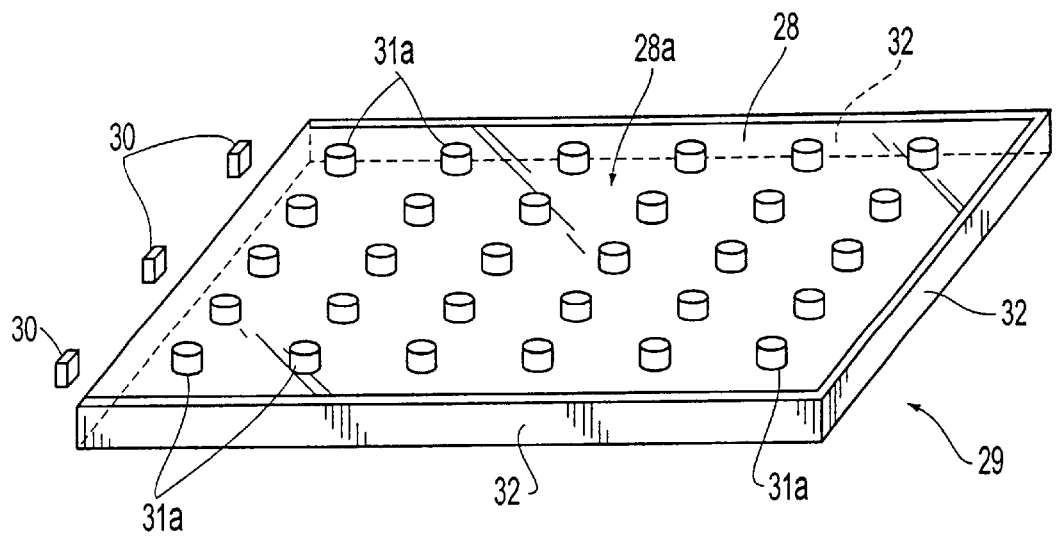
FIG. 11 is a perspective view of an example of a transparent surface-emitting device used as the principal part of the liquid crystal display unit shown in FIG. 7.
Figure 12:
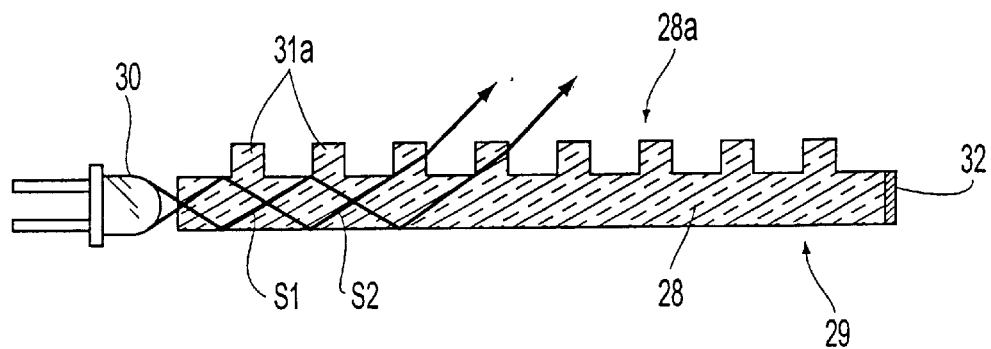
FIG. 12 is a cross-sectional view showing the sectional structure of the light emitting device shown in FIG. 11.

The transparent surface-emitting device 29 shown in FIG. 7 includes a light guide member 28 shaped like a plate having a light transmission property, and a plurality of, in this embodiment, three light sources located on the side of the light guide member 28, for example, LEDs (Light Emitting Diodes) 30, as shown in FIGS. 11 and 12. A surface 28a of the light guide member 28 on the upper side in the figure serves as a light emitting surface, that is, a viewer-side surface. The light emitting surface 28a is provided with a plurality of cylindrical projections 31a projecting outward in a regular or irregular dot arrangement. Light reflecting films 32 are bonded to the sides of the light guide member 28 other than the side where the LEDs 30 are located.

The light guide member 28 may be made of 1) a transparent resin such as acrylic resin, a polycarbonate resin, or a non-crystalline polyolefin resin, 2) an inorganic transparent material such as glass, or 3) a composite of these materials. Furthermore, it may be produced by various methods, for example, 1) injection molding, 2) a method utilizing a photo-setting ability of a resin, 3) etching, or 4) a method of joining a film onto a flat plate of transparent resin or glass.

In the light guide member 28, as shown in FIG. 12, light S1 and light S2 emitted from the LED 30 propagate inside the light guide member 28 while undergoing repeated total reflection from the inner surface of the light emitting surface 28a and the opposite surface. The light that has propagated to the side is reflected by the light reflecting film 32 formed thereon, and is caused to propagate again inside the light guide member 28. During this propagation, the light that has reached the side of the projection 31a emerges outside, and travels toward the liquid crystal layer 8 in FIG. 7, that is, toward the viewer side. Light from the LED 30 hardly emerges directly from the surface where the projections 31a are not formed.

The electronic watch with the construction described above has two display modes, a reflective display mode utilizing external natural light, and a transmissive display mode utilizing light emitted from the light emitting device 29. The modes will be individually described below.

Referring to FIG. 7, in performing display using external light without causing the light emitting device 29 to emit light, when a voltage is not applied between the electrodes 14a and 14b of the liquid crystal layer 8, linearly polarized light parallel to the plane of the figure is taken out by the polarizer 11 from external light, as shown by arrow P. Furthermore, this linearly polarized light is turned into linearly polarized light perpendicular to the plane of the figure with its polarization direction twisted through an angle of about 90° by the liquid crystal layer 8. This linearly polarized light sequentially passes through the polarization separating film 12, the diffusing layer 15, and the light guide member 28, and furthermore, is absorbed by the light receiving surface of the solar battery 18. Thereby, the region where the voltage is not applied is displayed as a background of a dark color such as black. The light received by the solar battery 18 is converted into electric power according to the function of the solar battery 18, and the electric power is charged in a storage section of a power supply (not shown) for watch driving as needed.

Next, when an on-state voltage is applied to the liquid crystal layer 8, as shown by arrow Q, linearly polarized light parallel to the plane of the figure is separated by the polarizer 11 from external natural light, and is further held parallel to the plane of the figure without the liquid crystal layer 8 substantially twisting its polarization direction. This linearly polarized light is reflected by the polarization separating film 12 according to the function of the polarization separating film 12. The reflected light passes through the liquid crystal layer 8 while remaining parallel to the plane of the figure, further passes through the polarizer 11, and emerges outside. This permits the viewer to perceive an image of a reflection color depending on the surface condition of the polarization separating film 12, for example, a mirror-reflection image, or a white image. As mentioned in connection with FIG. 10, this on-state voltage region is perceived as a visible image such as a number.

As mentioned above, when watch display is performed in the reflective display mode using external natural light, a background of black or the like is displayed in the off-state non-voltage applied region, and simultaneously, visible information of white or the like is displayed as watch information in the on-state voltage applied region. Electric power is generated in the off-state non-voltage applied region by the external light that reaches the solar battery 18, and is accumulated as needed.

The LED 30 of the light emitting device 29 is illuminated when the time display surface is dark and difficult to see at night or in a dark room. In this case, in a region where a voltage is not applied to the liquid crystal layer 8, light emitted from the LED 30 propagates inside the light guide member 28, and then, is emitted from the light emitting surface 28a toward the viewer side (that is, the upper side in the figure), as schematically shown by arrow R. This emergent light passes through the diffusing layer 15, is separated out as linearly polarized light perpendicular to the plane of the figure by the polarization separating film 12, and is turned into linearly polarized light parallel to the plane of the figure with its polarization direction twisted through an angle of about 90° by the liquid crystal layer 8. This linearly polarized light passes through the polarizer 11, and is displayed outside. This permits the viewer to perceive colored light, which is emitted from the light guide member 28 and passed through the diffusing layer 15, as a background. The light emitted from the light guide member 28 is usually red or green (emitted colors of the LED), and is diffused by the diffusing layer 15, whereby the observer can perceive a red or green (emitted colors of the LED) background.

Next, in a region where an on-state voltage is applied to the liquid crystal layer 8, light emitted from the LED 30 emerges from the light emitting surface 28a of the light guide member 28, passes through the diffusing layer 5, and is taken out as linearly polarized light perpendicular to the plane of the figure by the polarization separating film 12, as schematically shown by arrow T. Since this linearly polarized light passes through the liquid crystal layer 8 without twisting its polarization direction, its polarization direction does not align with the transmission axis of the polarizer 11. Therefore, the linearly polarized light is absorbed by the polarizer 11. As a result, this region is perceived as a black display by the viewer.

As mentioned above, when watch display is performed in the transmissive display mode using light emitted from the light emitting device 29, a background of red or green (emitted colors of the LED) or the like is displayed in the non-voltage applied region, and simultaneously, visible information is displayed as watch information in black or the like in the on-state voltage applied region. Since little light enters the solar battery 18 in this transmissive display mode, electric power generation is hardly performed by the solar battery 18.

As mentioned above, according to the electronic watch of this embodiment, a watch display in the form of numbers or the like can be produced in a different color as clearly distinguished from the background, no matter whether external natural light or light emitted from the light emitting device 29 is used. As a result, even when the solar battery is placed within the region of the watch display surface where numbers and the like are displayed, watch display can be performed without any trouble. Therefore, it is possible to make the light receiving area of the solar battery as large as possible, and to supply large electric power to the power supply for watch driving.

Figure 13:
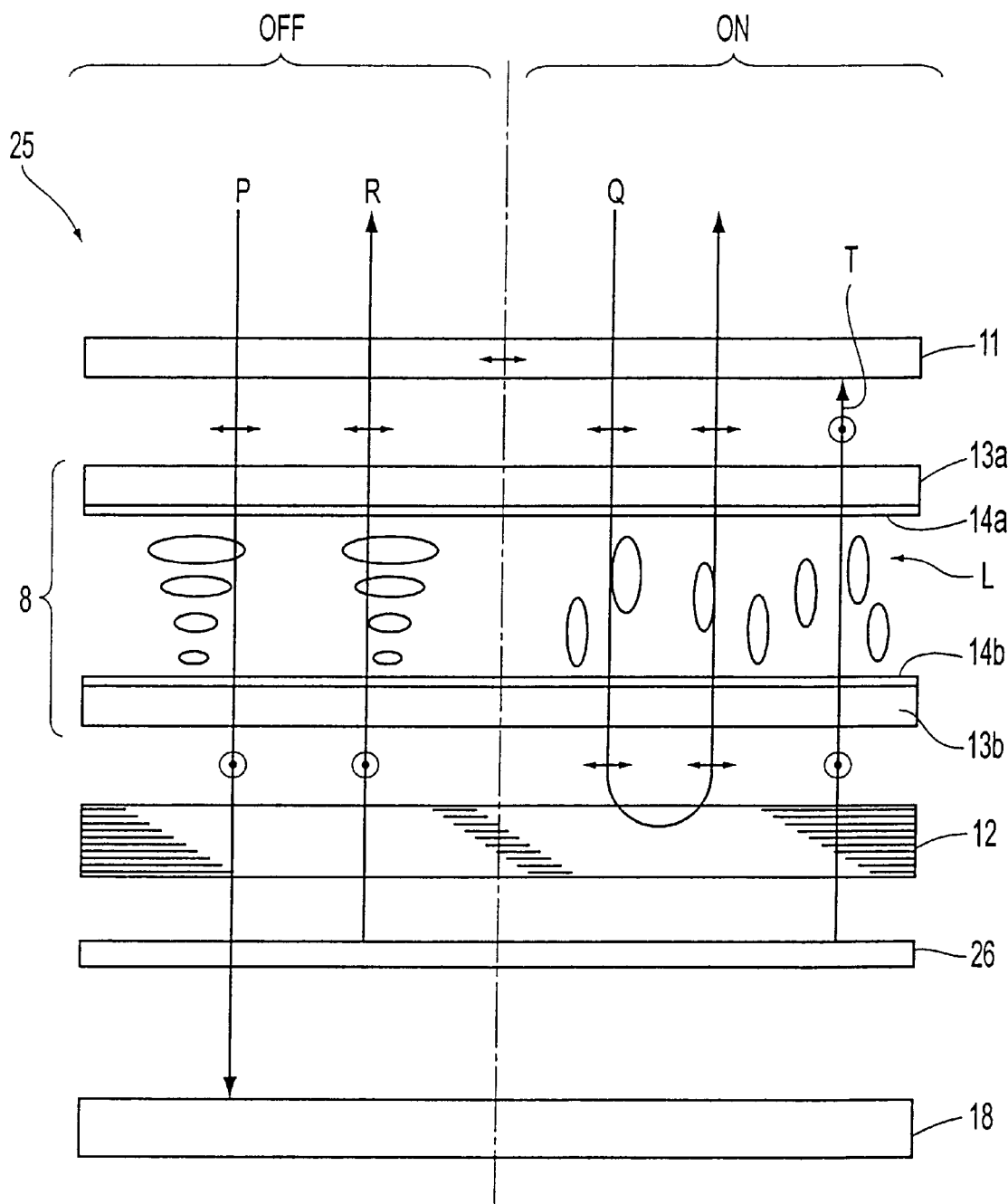
FIG. 13 is a schematic sectional view of a liquid crystal display unit for use in an electronic watch according to a further embodiment of the present invention.

FIG. 13 shows a liquid crystal display unit used in an electronic watch according to a further embodiment of the present invention. This liquid crystal display unit 25 is different from the liquid crystal display unit 5 shown in FIG. 7 in that a light-storage light emitting layer 26 is placed between a polarization separating film 12 and a solar battery 18 instead of the transparent surface-emitting device 29 and the diffusing layer 15 shown in FIG. 7. The same numerals in FIGS. 13 and 7 denote the same components, and therefore, a description thereof is omitted.

The upper surface of the light-storage light emitting layer 26 serves as a light receiving surface and a light emitting surface. When external light is received by the light receiving surface of the light-storage light emitting layer 26, it is stored as energy inside. The stored energy is radiated outside as light when it is dark outside. Furthermore, the light-storage light emitting layer 26 has a light storing property, and a property of transmitting an amount of light that can charge the solar battery 18.

In the electronic watch of this embodiment, when watch display is performed using external light, external light sequentially passes through a polarizer 11, a liquid crystal layer 8, the polarization separating film 12, and the light-storage light emitting layer 26 in a region where a voltage is not applied, and then, it reaches the light receiving surface of the solar battery 18, as shown by arrow P. This region is perceived as a dark-colored background by a viewer. Simultaneously, the light that has reached the solar battery 18 is converted into electric power, and is used as a power supply for the watch display. In a region where an on-state voltage is applied, information such as numbers is displayed by light reflected from the polarization separating film 12, as shown by arrow Q, in a similar manner to the case shown in FIG. 7.

When this electronic watch is used at night or placed in a dark room, energy stored inside the light-storage light emitting layer 26 is emitted as light from the light emitting surface. In this case, the emitted light passes through the polarization separating film 12, the liquid crystal layer 8, and the polarizer 11 in a region where a voltage is not applied to the liquid crystal layer 8, as shown by arrow R, and it is displayed outside. This permits the viewer to perceive the colored light emitted from the light-storage light emitting layer 26 as a background.

On the other hand, in a region where an on-state voltage is applied to the liquid crystal layer 8, light emitted from the light-storage light emitting layer 26 passes through the polarization separating film 12 and the liquid crystal layer 8, and is absorbed by the polarizer 11, as shown by arrow T. As a result, this region is perceived as a black display by the viewer.

As mentioned above, the electronic watch of this embodiment can achieve a transmissive display mode by using the light-storage light emitting layer 26 that does not need its own electric power. In addition, the electronic watch can convert external light into electric power by using the solar battery 18, and use the electric power as a power source for the watch.

Figure 14:
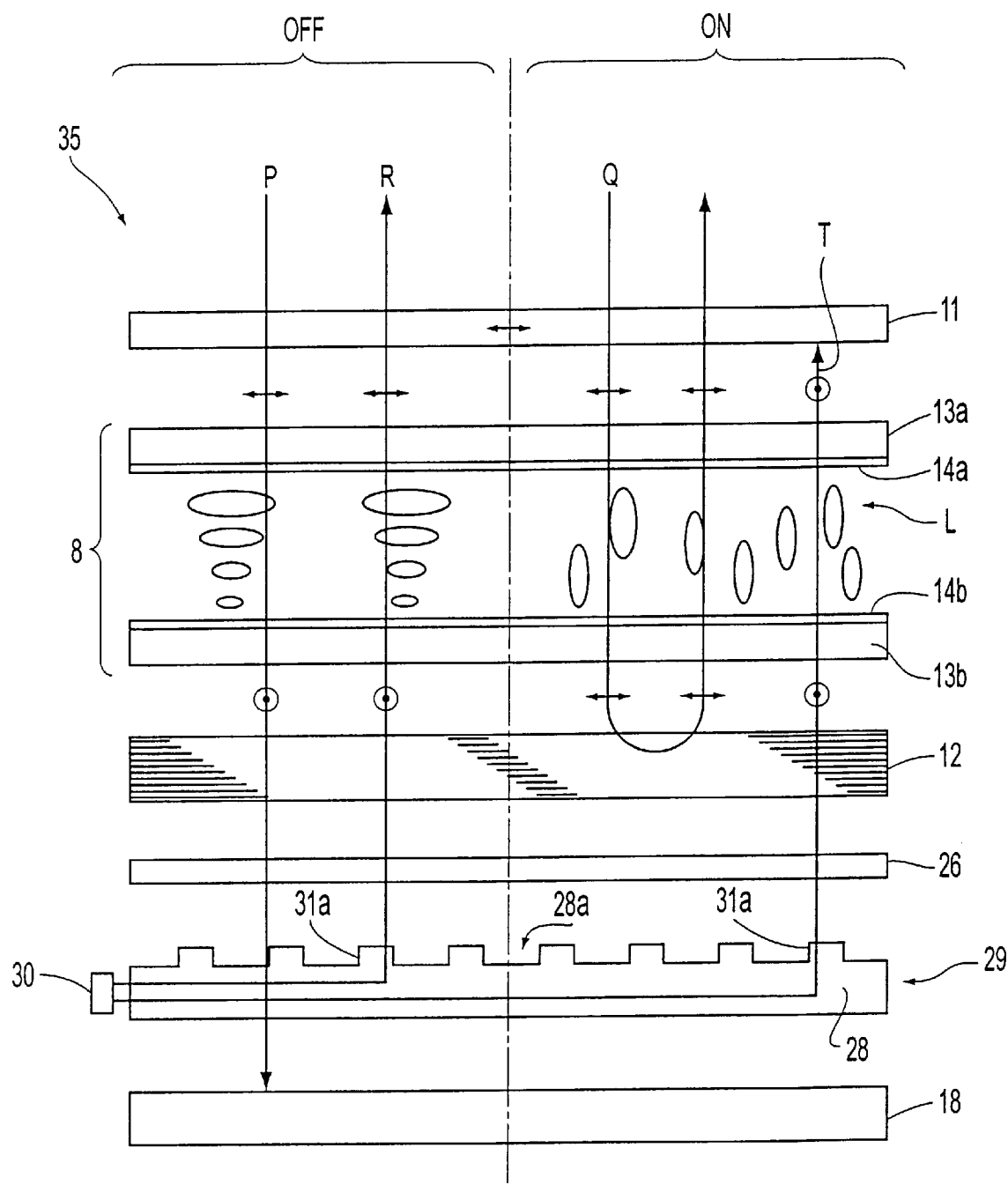
FIG. 14 is a schematic sectional view of a liquid crystal display unit for use in an electronic watch according to a still further embodiment of the present invention.

FIG. 14 shows a liquid crystal display unit for use in an electronic watch according to a still further embodiment of the present invention. This liquid crystal display unit 35 is different from the liquid crystal display unit 5 shown in FIG. 7 in that a light-storage light emitting layer 26 is placed between a polarization separating film 12 and a transparent surface-emitting device 29 instead of the diffusing layer 15 shown in FIG. 7. The same numerals in FIGS. 14 and 7 denote the same components, and therefore, a description thereof is omitted.

According to this embodiment, a watch display can be produced by using light emitted from the light-storage light emitting layer 26, and furthermore, by using light emitted from the transparent surface-emitting device 29. Preferably, first, display is performed by using light emitted from the light-storage light emitting layer 26. When the amount of the light decreases to a practically insufficient amount, an LED 30 of the light emitting device 29 is illuminated, and light emitted from the light emitting device 29 is used.

Figure 15:
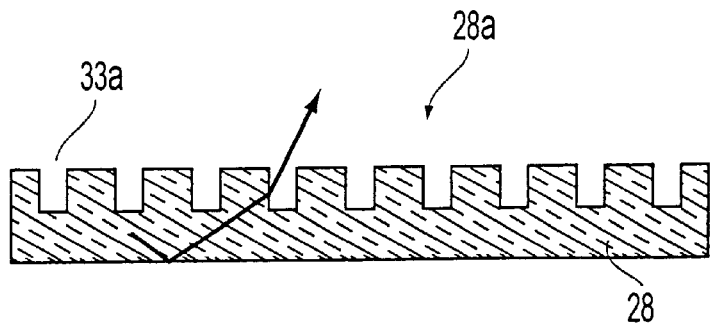
FIG. 15 is a cross-sectional view showing one form of a light guide member.

In the light guide member 28 shown in FIGS. 7 and 14, the light emitting surface 28a is provided with the cylindrical projections 31a in order to take the light of the LED 30 outside from the light emitting surface 28a. Instead of these projections 31a, cylindrical recesses 33a may be formed on the light emitting surface 28a, as shown in FIG. 15.

Figure 16:
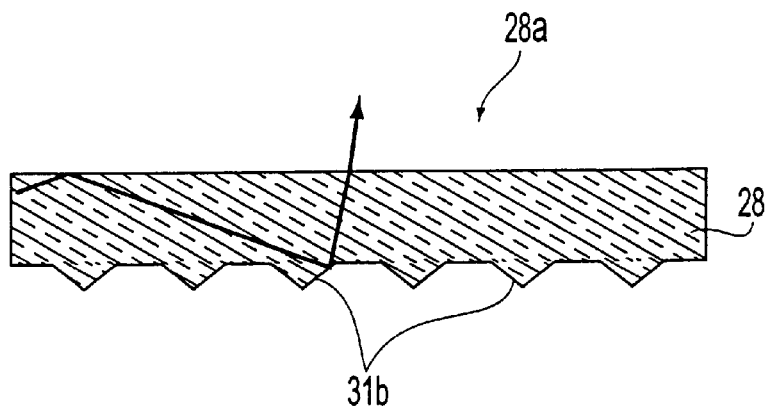
FIG. 16 is a cross-sectional view of another form of the light guide member.
Figure 17:
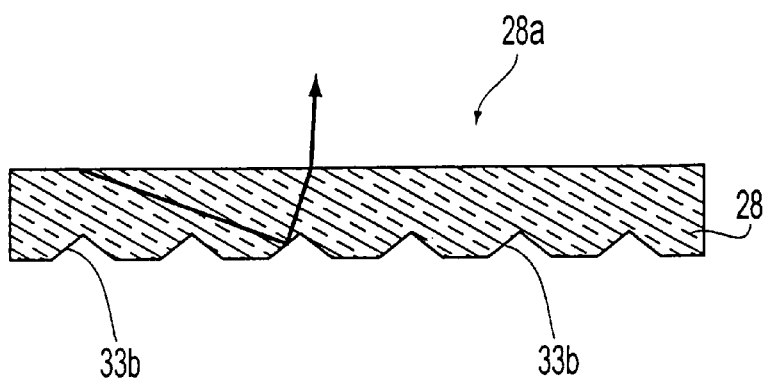
FIG. 17 is a cross-sectional view of a further form of the light guide member.
Figure 18:
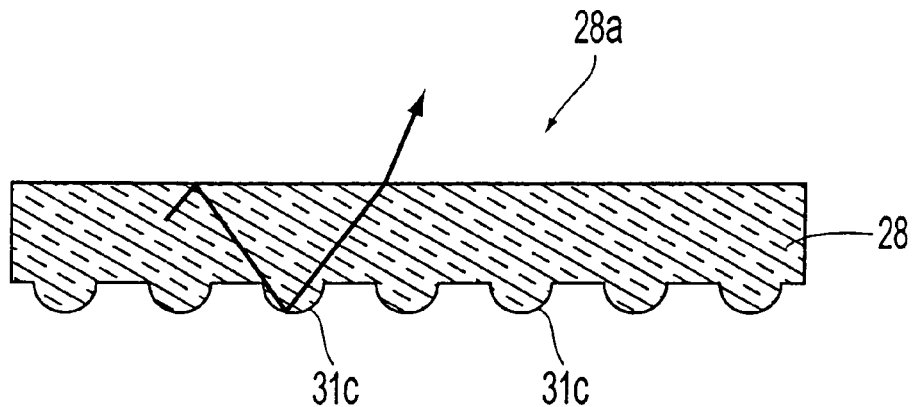
FIG. 18 is a cross-sectional view of a still further form of the light guide member.
Figure 19:
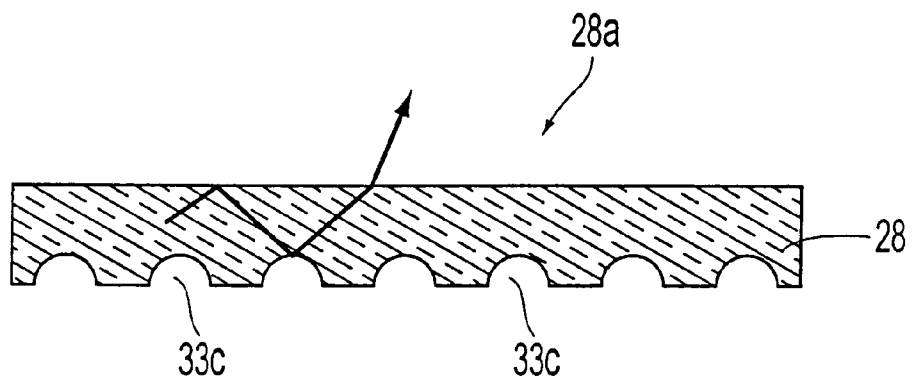
FIG. 19 is a cross-sectional view of a yet further form of the light guide member.
Figure 20:
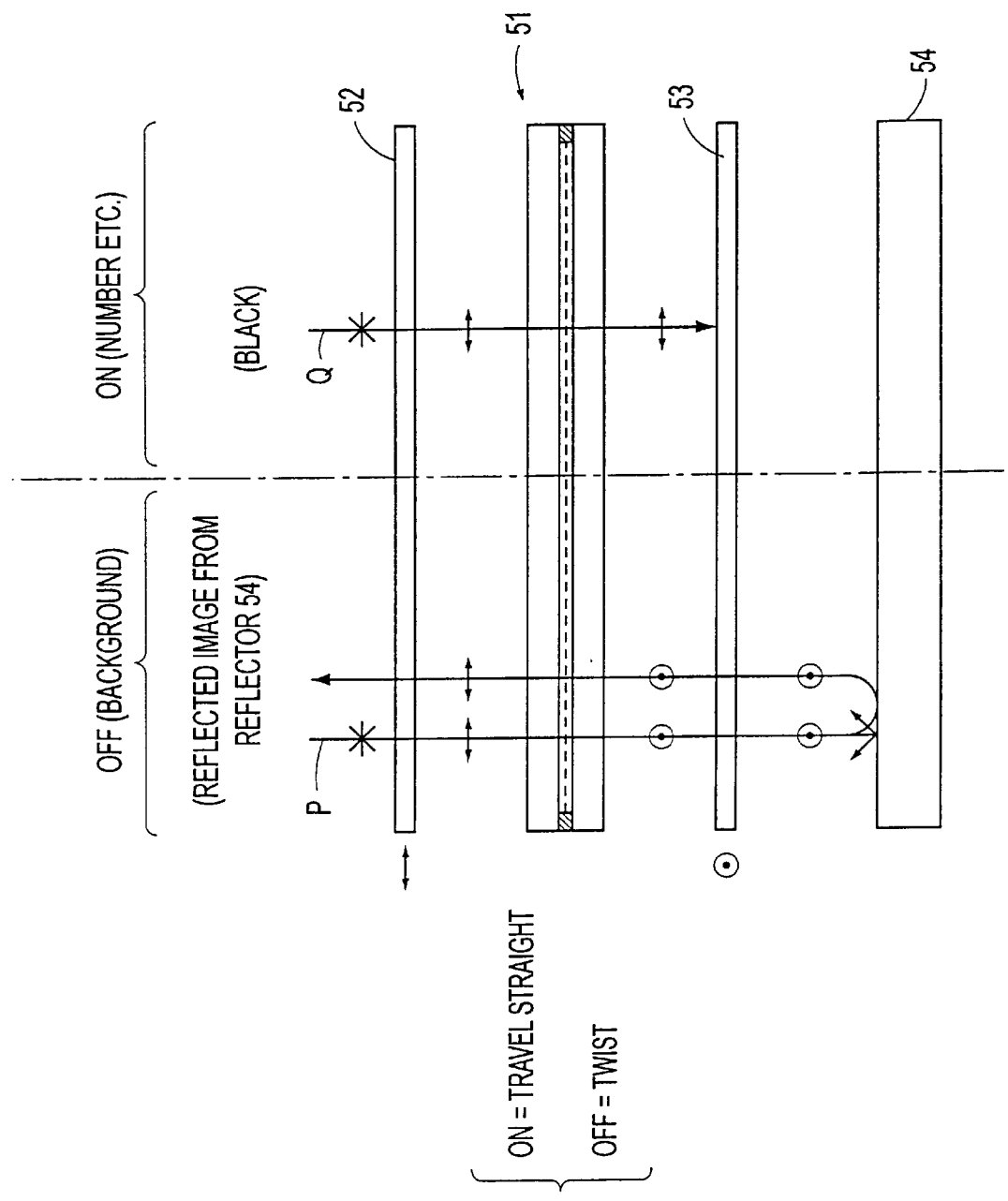
FIG. 20 is a schematic view showing the principal part of an example of a conventional display device.

Furthermore, as shown in FIG. 16, conical projections 31b may be formed on the back of the light emitting surface 28a of the light guide member 28. Still furthermore, as shown in FIG. 17, conical recesses 33b may be formed on the back of the light emitting surface 28a of the light guide member 28. Yet furthermore, as shown in FIG. 18, hemispheric projections 31c may be formed on the back of the light emitting surface 28a of the light guide member 28. Yet still furthermore, as shown in FIG. 19, hemispheric recesses 33c may be formed on the back of the light emitting surface 28a of the light guide member 28.

According to the display device and the electronic watch, since at least one of the polarization separators for sandwiching the polarization changing element is formed of a polarization separating element that has a property of transmitting linearly polarized light polarized in one direction and reflecting other linearly polarized light, when the solar battery is used as a reflector, information such as numbers can be displayed in a light color on a dark-colored background. As a result, a watch display or another display can be produced without any practical trouble even when the solar battery is used as a reflector.

Furthermore, since the background in the display plane, that is, a wide region in the display plane, serves as a light receiving surface of the solar battery, it is possible to cause the solar battery to gather large amounts of external light and to convert the external light into electric energy. Still furthermore, since the solar battery can be placed within the display area where watch information such as number information is displayed, it is possible to markedly reduce the overall size of the display device and the electronic watch, or to establish a wide display area for watch display or the like, compared with a conventional case in which the solar battery is placed separate from the display area.

Since the transparent surface-emitting device is placed on the back of the second polarization separator as viewed from the viewer, a watch display can be produced by using light emitted from the light emitting element in a dark place where external light does not enter.

What is claimed is:

1. A display device, comprising:
   a first polarization separator that transmits linearly polarized light polarized in a first direction and does not transmit linearly polarized light polarized in a direction perpendicular to the first direction;
   a polarization changing element positioned to receive linearly polarized light emerging from said first polarization separator and that selects between a state of changing a polarization direction of polarized light transmitted therethrough and a state of not changing the polarization direction;
   a second polarization separator disposed opposite to said first polarization separator with said polarization changing element interposed therebetween, the second polarization separator transmitting linearly polarized light polarized in a second direction and reflecting linearly polarized light polarized in a direction perpendicular to the second direction;
   a solar battery disposed opposite to said polarization changing element with said second polarization light separator disposed therebetween, the solar battery receiving external light and converting the external light into electric energy; and
   said solar battery reflecting a portion of the external light when said polarization changing element changes the polarization direction of polarized light transmitted therethrough.

2. The display device according to claim 1, said second polarization separator having a multilayer structure including two types of layers alternately stacked, with any two adjacent layers in a stacking direction having a same refractive index in one direction and a different refractive index in a direction perpendicular to the one direction, and said layers having a different thickness in the stacking direction.

3. The display device of claim 1, the reflected portion of the external light generating a background color on the display device.

4. An electronic watch for measuring and displaying time, comprising:

a first polarization separator that transmits linearly polarized light polarized in a first direction and does not transmit linearly polarized light polarized in a direction perpendicular to the first direction;

a polarization changing element positioned to receive linearly polarized light emerging from said first polarization separator and that selects between a state of changing a polarization direction of polarized light transmitted therethrough and a state of not changing the polarization direction;

a second polarization separator disposed opposite to said first polarization separator with said polarization changing element interposed therebetween, the second polarization separator transmitting linearly polarized light polarized in a second direction and reflecting linearly polarized light polarized in a direction perpendicular to the second direction;

a solar battery disposed opposite to said polarization changing element with said second polarization separator disposed therebetween, the solar battery receiving external light and converting the external light into electric energy; and said solar battery reflecting a portion of the external light when said polarization changing element changes the polarization direction of polarized light transmitted therethrough.

5. The electronic watch according to claim 4, said second polarization separator having a multilayer structure including two types of layers alternately stacked, with any two adjacent layers in a stacking direction having a same refractive index in one direction and a different refractive index in a direction perpendicular to the one direction, and said plural layers having a different thickness in the stacking direction.

6. The electronic watch of claim 5, the reflected portion of the external light generating a background color on the electronic watch.

7. An electronic watch for measuring and displaying time, comprising:

a first polarization separator that transmits linearly polarized light polarized in a first direction and does not transmit linearly polarized light polarized in a direction perpendicular to the first direction;

a polarization changing element positioned to receive linearly polarized light emerging from said first polarization separator and that selects between a state of changing a polarization direction of polarized light transmitted therethrough and a state of not changing the polarization direction;

a second polarization separator disposed opposite to said first polarization separator with said polarization changing element interposed therebetween, the second polarization separator transmitting linearly polarized light polarized in a second direction and reflecting linearly polarized light polarized in a direction perpendicular to the second direction;

a transparent surface-emitting device disposed opposite to said polarization changing element with said second polarization separator disposed therebetween, a solar battery disposed opposite to said second polarization separator with said transparent surface-emitting device disposed therebetween, the solar battery receiving external light and converting the external light into electric energy; and said solar battery reflecting a portion of the external light when said polarization changing element changes the polarization direction of polarized light transmitted therethrough.

8. The electronic watch according to claim 7, said transparent surface-emitting device including a light source that emits light, and a light guide member provided with a light emitting surface on a side facing said polarization changing element to guide light from said light source to said light emitting surface.

9. The electronic watch according to claim 8, said light guide member having one of a convex portion and a concave portion on one of said light emitting surface and an opposite side thereto to emit light from said light emitting surface.

10. The electronic watch according to claim 7, said transparent surface-emitting device including a light-storage light emitting layer.

11. The electronic watch according to claim 7, said transparent surface-emitting device being provided with a light diffusing layer on a side of a viewer.

12. The electronic watch of claim 7, the reflected portion of the external light generating a background color on the electronic watch.

13. An electronic watch, comprising:

a polarizer;

a TN liquid crystal layer;

a polarization separating film that transmits linearly polarized light polarized in a first direction and reflects linearly polarized light polarized in a direction perpendicular to the first direction;

a solar battery, wherein said polarizer, said TN liquid crystal layer, said polarization separating film and said solar battery are disposed one on top of another in this order; and the solar battery reflecting a portion of the light transmitted by said polarization separating film to generate a background color on the electronic watch.

14. The electronic watch of claim 13, the solar battery receiving light transmitted by said polarization separating film and converting the light into electric energy.

* * * * *